US012097965B2

United States Patent
Delbosc et al.

(10) Patent No.: US 12,097,965 B2
(45) Date of Patent: Sep. 24, 2024

(54) ELECTRIC ARCHITECTURE FOR A HYBRID THERMAL/ELECTRIC PROPULSION AIRCRAFT AND TWIN-ENGINED AIRCRAFT COMPRISING SUCH AN ARCHITECTURE

(71) Applicants: SAFRAN, Paris (FR); SAFRAN AIRCRAFT ENGINES, Paris (FR); SAFRAN ELECTRICAL & POWER, Blagnac (FR)

(72) Inventors: Philippe Delbosc, Moissy-Cramayel (FR); Clement Dupays, Moissy-Cramayel (FR); Anne Lienhardt, Moissy-Cramayel (FR); Benoit Michaud, Moissy-Cramayel (FR); Cyrille Gautier, Moissy-Cramayel (FR); Anthony Gimeno, Moissy-Cramayel (FR)

(73) Assignees: SAFRAN, Paris (FR); SAFRAN AIRCRAFT ENGINES, Paris (FR); SAFRAN ELECTRICAL & POWER, Blagnac (FR)

( * ) Notice: Subject to any disclaimer, the term of this patent is extended or adjusted under 35 U.S.C. 154(b) by 104 days.

(21) Appl. No.: 17/756,132

(22) PCT Filed: Nov. 12, 2020

(86) PCT No.: PCT/FR2020/052067
§ 371 (c)(1),
(2) Date: May 18, 2022

(87) PCT Pub. No.: WO2021/099720
PCT Pub. Date: May 27, 2021

(65) Prior Publication Data
US 2022/0411082 A1 Dec. 29, 2022

(30) Foreign Application Priority Data
Nov. 21, 2019 (FR) ........................ 1912988

(51) Int. Cl.
*B64D 27/24* (2024.01)
*B64D 27/02* (2006.01)
(Continued)

(52) U.S. Cl.
CPC ............. *B64D 27/24* (2013.01); *B64D 41/00* (2013.01); *H02J 4/00* (2013.01); *B64D 27/026* (2024.01);
(Continued)

(58) Field of Classification Search
CPC ................................................ B64D 2027/026
See application file for complete search history.

(56) References Cited

U.S. PATENT DOCUMENTS

2007/0257558 A1* 11/2007 Berenger .................. H02J 1/10
307/10.1
2012/0098329 A1* 4/2012 Jones .................... B60L 3/0061
307/9.1
(Continued)

FOREIGN PATENT DOCUMENTS

EP 1852953 A1 11/2007
EP 2974964 A1 1/2016
(Continued)

OTHER PUBLICATIONS

International Search Report and Written Opinion received for PCT Patent Application No. PCT/FR2020/052067, mailed on Mar. 31, 2021, 26 pages (10 pages of English Translation and 16 pages of Original Document).

*Primary Examiner* — Timothy D Collins
*Assistant Examiner* — Eric Acosta
(74) *Attorney, Agent, or Firm* — WOMBLE BOND DICKINSON (US) LLP (57) ABSTRACT

An electric architecture for a twin-engined, hybrid thermal/electric propulsion aircraft and, for each turboshaft which includes a high-voltage DC propulsive electric distribution network, a non-propulsive electric distribution network which is connected to loads of the aircraft, and an electric
(Continued)

distribution network which is connected to loads of an electrified control system of the turboshaft engine, and wherein power supply sources are shared for these different networks.

20 Claims, 4 Drawing Sheets

(51) Int. Cl.
*B64D 41/00* (2006.01)
*H02J 4/00* (2006.01)
(52) U.S. Cl.
CPC ....... *B64D 2221/00* (2013.01); *H02J 2310/44* (2020.01)

(56) References Cited

U.S. PATENT DOCUMENTS

2015/0123463 A1* 5/2015 Huang .................... B60R 16/03
307/9.1
2018/0291807 A1 10/2018 Dalal

FOREIGN PATENT DOCUMENTS

FR  3012796 A1  5/2015
FR  3065840 A1  11/2018

* cited by examiner

ELECTRIC ARCHITECTURE FOR A HYBRID THERMAL/ELECTRIC PROPULSION AIRCRAFT AND TWIN-ENGINED AIRCRAFT COMPRISING SUCH AN ARCHITECTURE

TECHNICAL FIELD

The invention relates to an electric architecture for a hybrid thermal/electric propulsion aircraft comprising, for each turboshaft engine, such an architecture.

PRIOR ART

The prior art comprises in particular the documents FR-A1-3 012 796, EP-A1-1 852 953, US-A1-2018/291807, FR-A1-3 065 840, EP-A1-2 974 964 and US-A1-2012/098329.

It is known from the prior art a hybrid propulsion installation of an aircraft, commonly referred to as parallel hybridization, with a thermoelectrical power generation.

A hybrid propulsion installation typically comprises multiple electric distribution networks for each turboshaft engine: a propulsive electric distribution network for supplying propulsion system-related equipment, a non-propulsive electric distribution network for supplying loads of the aircraft, and an electric distribution network for the loads of the electrified control system of the turboshaft engine. However, these electric distribution networks are generally supplied by separate energy sources.

There is a need to share the energy sources of these different electric distribution networks. Indeed, a solution without sharing these sources, such as a solution with exclusive electric generators for the propulsive electric distribution network, has disadvantages:
the integration of a greater number of electric machines in each turboshaft engine,
the reduction of the flexibility in the distribution of power between generators within the turboshaft engines,
the important dimensioning of the electric generators, and
the low use of certain equipment related to the hybridization (less than 10% use of certain equipment), which therefore represents an unnecessary mass when not used.

The purpose of the invention is to propose a solution allowing to remedy at least to some of these disadvantages.

SUMMARY OF THE INVENTION

The purpose of the invention is to provide a hybrid thermal-electric propulsion architecture that respects the main principles of electric safety, such as electric isolation between the propulsive electric distribution network, the non-propulsive electric distribution network and the electric distribution network for the loads of the electrified control system of the turboshaft engine, as well as the electric isolation between the electric distribution networks of the turboshaft engines, and that is optimized in terms of number of components or equipment.

In particular, the present invention provides a hybrid propulsion architecture allowing the injection and the collection of power from the high and low-pressure shafts of the turboshaft engines for the propulsive needs of the aircraft, the providing of electrical power to the loads of the aircraft, and the providing of electrical power to the loads of the electrified control systems of the turboshaft engines of the aircraft, and this in an optimal and secure manner.

The principle of the present invention is based on the sharing of certain sources for the three electric distribution networks to be supplied.

To this end, the invention relates to an electric architecture for a hybrid thermal/electric propulsion aircraft, said aircraft comprising two turboshaft engines, each turboshaft engine being provided with an electrified control system, and for each turboshaft engine, said architecture comprises:
- a high-voltage direct propulsive electric distribution network,
- a non-propulsive electric distribution network coupled to loads of the aircraft or to turboshaft engines,
- a plurality of first electric machines mechanically coupled to a high-pressure shaft of said turboshaft engine, each of said first electric machines being configured to operate in a motor mode to provide mechanical propulsive power and in a generator mode to receive mechanical power and provide electrical power,
- at least one second electric machine mechanically coupled to a low-pressure shaft of said turboshaft engine and configured to operate in a motor mode to provide mechanical propulsive power and in a generator mode to receive mechanical power and provide electrical power,
- at least one auxiliary energy source coupled to said propulsive electric distribution network and configured to provide energy to said first and second electric machines when said first and/or second electric machines are operating in a motor mode and to supply said propulsive electric distribution network,
- electronic energy conversion means coupled to said first and second electric machines, to said auxiliary energy source and to said propulsive electric distribution network,
- an electric distribution network coupled to loads of said electrified control system, and
- at least one third electric machine mechanically coupled to said high-pressure shaft and configured to operate in a generator mode to receive mechanical power and provide electrical power, said third electric machine being dedicated to said electric distribution network coupled to loads of said electrified control system.

The propulsive electric distribution network is intended to supply high-powered equipment, in particular equipment related to the propulsion system, such as electric machines. This network has the highest voltage level in the architecture. The use of the propulsive electric distribution network only for the high-powered equipment minimizes the current to be provided, and therefore allows to reduce the number of cables with a large cross-section, and thus reduces the overall dimension and the mass required for electric cables.

The non-propulsive electric distribution network is intended to supply power to intermediate power equipment, i.e., equipment related to the non-propulsive system referred to as "loads" of the aircraft, or low power loads of the turboshaft engines or of the aircraft. This network has a voltage level lower than the voltage level of the propulsive electric distribution network. The non-propulsive electric distribution network can be a direct or alternative electric distribution network. The first electric machines are electric sources when they operate in generator mode, and loads when they operate in motor mode, in particular at the starting of the turboshaft engine.

In the same way, the second electric machine or machines are electric sources when they work in generator mode, and loads when they work in motor mode, in particular at the starting of the turboshaft engine.

Advantageously, the architecture according to the invention presents synergies between its various members, and in particular between the main sources (first and second electric machines) and additional sources (auxiliary energy source) for the supply of electrical energy to all the consumers of the electric distribution networks in the various phases of operation, which allows an optimization of the mass and of the volume of the latter, in particular thanks to the sharing of the equipment to carry out various functions within the aircraft.

The architecture according to the invention guarantees the availability of the different functions within the aircraft, and ensures the safe operation of the aircraft.

Advantageously, the architecture according to the invention can be reconfigured, which allows an availability and an operating safety adapted to the needs of the aircraft.

The energy management and the dimensioning of the architecture according to the invention are optimized, in particular thanks to the presence of additional sources on the propulsive electric distribution network. This advantageously allows an optimization of the mass and of the volume of the architecture. Indeed, it is possible to choose at each moment the source of electrical energy most adapted to the needs of the aircraft, and the best distribution between the various sources (sources in the turboshaft engine (first and second electric machines) or sources in the aircraft (auxiliary energy source)).

Advantageously, the dimensioning of the equipment, for example of the motor-pump type, of the electrified control system of the turboshaft engines is optimized, in particular thanks to the flexibility of the electrical supply provided.

The propulsive electric distribution network can be designed with lower network quality constraints than the non-propulsive electric distribution network. This advantageously allows to limit the mass of the filtering elements necessary to guarantee the quality of the network (due to the fact that this network will be dedicated to a number of loads or energy sources of high power naturally less sensitive than the loads of the aircraft supplied by the non-propulsive electric distribution network). This also allows to limit the constraints on the cut-off capacity of the protection components of the propulsive electric distribution network (by limiting the fault currents), thanks to the control of the various electronic power converters.

The electric distribution network coupled to loads of the electrified control system may comprise:
  a first direct electric distribution sub-network, said first direct electric distribution sub-network being configured to be supplied by said propulsive electric distribution network or by said non-propulsive electric distribution network, and
  a second alternative electric distribution sub-network.

The architecture may also comprise isolation and cut-off means configured to switch from a first configuration in which said second alternative power sub-network is coupled to said third electric machine so as to be supplied by said third electric machine, to a second configuration in which said second alternative electric distribution sub-network is coupled to said first direct electric distribution sub-network, via at least one electronic power converter, so as to be supplied by said first direct electric distribution sub-network, and vice versa.

The architecture according to the invention may comprise at least one electronic power converter connecting said propulsive electric distribution network and said non-propulsive electric distribution network.

The architecture according to the invention may comprise at least one electronic power converter connecting said propulsive electric distribution network and said electric distribution network coupled to loads of said electrified control system.

According to one embodiment, the first electric machines are mechanically coupled to the high-pressure shaft in direct connection.

According to another embodiment, the first electric machines are mechanically coupled to the high-pressure shaft by means of a first accessory gear box.

According to one embodiment, the second electric machine or machines are mechanically coupled to the low-pressure shaft in direct connection.

According to another embodiment, the second electric machine or machines are mechanically coupled to the low-pressure shaft by means of a second accessory gear box.

The first electric machines can be segregated from each other.

According to one embodiment, the first electric machines are segregated from each other on the first accessory gear box (full segregation).

According to another embodiment, the first electric machines are segregated from each other on the high-pressure shaft (complete segregation).

According to another embodiment, the first electric machines have a common casing on the high-pressure shaft and are segregated from each other by means of magnetic and electric circuits (internal segregation). The magnetic and electric circuits can be partially or totally segregated.

According to another embodiment, the first electric machines have a common casing on the high-pressure shaft and a common rotor magnetic circuit, and are magnetically and electrically segregated from each other on a stator.

According to another embodiment, the first electric machines have a common casing on the high-pressure shaft and a common rotor and stator magnetic circuit, and are electrically segregated from each other on the stator.

The architecture according to the invention may comprise a plurality of auxiliary energy sources.

The auxiliary energy sources may comprise one or a plurality of reversible energy storage elements and/or one or a plurality of auxiliary electric machines and/or one or a plurality of fuel cells. The auxiliary energy sources comprising reversible energy storage elements advantageously allow the architecture to be able to store the energy drawn off from the high-pressure and low-pressure shafts of the turboshaft engine in the collection phases, and from the other auxiliary energy sources, for reuse it in other phases.

The one or more reversible energy storage elements may comprise batteries and/or super-capacitors.

According to an embodiment in which the one or more reversible energy storage elements are super-capacitors, the electronic energy conversion means comprise reversible electronic direct-to-direct power converters coupled between the one or more reversible energy storage elements and the propulsive electric distribution network.

According to an embodiment in which the one or more reversible energy storage elements are batteries, the electronic energy conversion means comprise reversible electronic direct-to-direct power converters coupled between the one or more reversible energy storage elements and the propulsive electric distribution network.

According to another embodiment in which the one or more reversible energy storage elements are batteries, the one or more reversible energy storage elements are coupled directly to the propulsive electric distribution network.

The auxiliary energy source or sources may be arranged in the aircraft, i.e., the auxiliary energy source or sources may not be integrated in the turboshaft engines.

The auxiliary energy source or sources can be shared for both turboshaft engines.

According to an embodiment, the electronic energy conversion means are arranged in proximity to the first and second electric machines.

According to another embodiment, the electronic energy conversion means are arranged remotely from the first and second electric machines, for example in the turboshaft engine, in particular in the nacelle, or in the aircraft.

The propulsive electric distribution network may comprise:
a first propulsive electric distribution sub-network coupled to the first and second electric machines, and
a second propulsive electric distribution sub-network coupled to said auxiliary energy source.

The architecture may further comprise isolation and cut-off means arranged between the first and second propulsive electric distribution sub-networks and configured to enable or disable the connection between said first and second propulsive electric distribution sub-networks.

The first and second electric machines can be connected in parallel, via associated electronic power converters, to the first propulsive electric distribution sub-network.

The architecture may comprise isolation and cut-off means arranged between each first electric machine with its associated electronic power converter and the first propulsive electric distribution sub-network and configured to enable or disable the connection between each first electric machine and the propulsive electric distribution sub-network.

The architecture may comprise isolation and cut-off means arranged between the second electric machine or the second electric machines with their associated electronic power converters and the first propulsive electric distribution sub-network and configured to enable or disable the connection between the second electric machine or the second electric machines and the propulsive electric distribution sub-network.

The first and second electric machines can be coupled to the first propulsive electric distribution sub-network by means of the electronic energy conversion means.

The electronic energy conversion means may comprise electronic DC/AC converters coupled between the first electric machines and the propulsive electric distribution network.

The electronic energy conversion means may comprise an electronic DC/AC converter coupled between the second electric machine or the second electric machines and the propulsive electric distribution network.

The architecture may comprise isolation and cut-off means arranged between the auxiliary energy source and the second propulsive electric distribution sub-network and configured to enable or disable the connection between the auxiliary energy source and the propulsive electric distribution sub-network.

The auxiliary energy source may be coupled to the second propulsive electric distribution sub-network by the electronic energy conversion means. The electronic energy conversion means may comprise an electronic power converter coupled between the auxiliary energy source and the propulsive electric distribution network. This electronic power converter is direct-to-direct when the auxiliary energy source is of battery or super-capacitor type. This electronic power converter is direct-to-alternative when the auxiliary energy source is a starter-generator type.

The first propulsive electric distribution sub-network can be arranged in the turboshaft engine.

The second propulsive electric distribution sub-network may be arranged in the aircraft, i.e., the second propulsive electric distribution sub-network is not arranged in the turboshaft engine.

According to one embodiment, the propulsive electric distribution network is configured to directly supply a portion of the loads of the aircraft.

The auxiliary electric machine or the auxiliary electric machines may be coupled to one or a plurality of auxiliary power units.

The architecture may comprise at least one auxiliary power unit coupled with a starter-generator, said auxiliary power unit being coupled to the propulsive electric distribution network, via at least one electronic direct DC/AC converter. The electronic DC/AC converter can be configured to provide power to the starter-generator to start the auxiliary power unit and to provide power to the propulsive electric distribution network when the auxiliary power unit is started.

The architecture may comprise a diode bridge arranged between the auxiliary power unit and the propulsive electric distribution network.

The electronic DC/AC converter can be configured to, once the auxiliary power unit is started, supply aircraft electric machines, such as compressors of an aircraft air conditioning system.

The voltage of the first direct electric distribution sub-network may be less than or equal to the voltage of the propulsive electric distribution network.

The electronic energy conversion means may comprise an electronic direct-to-direct energy converter coupled between the first direct electric distribution sub-network and the propulsive electric distribution network.

The electronic direct-to-direct power converter may have galvanic isolation.

The electronic energy conversion means may comprise an electronic power converter coupled between the first direct electric distribution sub-network and the non-propulsive electric distribution network.

According to an embodiment in which the non-propulsive electric distribution network is a direct electric distribution network, the electronic power converter is an electronic direct-to-direct power converter.

According to an embodiment in which the non-propulsive electric distribution network is an alternative electric distribution network, the electronic power converter is an electronic DC/AC converter.

The third electric machine can be a permanent magnet machine.

The electronic energy conversion means may comprise electronic DC/AC converters arranged in parallel between the first direct electric distribution sub-network and the second alternative electric distribution sub-network.

The electronic energy conversion means may comprise at least one or more electronic power converters coupled between the non-propulsive electric distribution network and the propulsive electric distribution network.

The electronic power converters can be connected to each other in parallel.

The electronic power converters can be reversible.

The electronic power converters may have a galvanic isolation. This allows to ensure that certain types of defects do not propagate from one electric distribution network to the other.

According to an embodiment in which the non-propulsive electric distribution network is a direct electric distribution network, the electronic power converters are electronic direct-to-direct power converters.

According to an embodiment in which the non-propulsive electric distribution network is an alternative electric distribution network, the electronic power converters are electronic DC/AC converters. These converters can be synchronized with the auxiliary power unit or with external sources, to avoid voltage drops in the supply of the loads during the switching of the sources, or to allow to manage and optimize the consumption according to the different energy sources.

The invention also relates to a hybrid thermal/electric propulsion aircraft comprising two turboshaft engines, each turboshaft engine comprising a high-pressure shaft and a low-pressure shaft, and for each turboshaft engine, said aircraft comprises a hybrid propulsion architecture according to the invention.

According to one embodiment, the propulsive electric distribution network of a first turboshaft engine is coupled to the propulsive electric distribution network of a second turboshaft engine. The aircraft further comprises isolation and cut-off means arranged between the propulsive electric distribution networks of the first and second turboshaft engines and configured to enable or disable the connection between these electric distribution networks.

According to another embodiment, the propulsive electric distribution networks of the first and second turboshaft engines are independent and segregated.

The aircraft may further comprise a backup non-propulsive electric distribution network. The backup non-propulsive electric distribution network can be supplied from the non-propulsive electric distribution networks of both turboshaft engines. The non-propulsive electric distribution network of a first turboshaft engine can be segregated from the non-propulsive electric distribution network of a second turboshaft engine.

The loads may comprise an environmental control system (ECS) of the aircraft, which controls the pressure and the temperature of the cabin of the aircraft, and the electronic power converter may be configured to operate as a starter for the auxiliary power unit, and as the electronic power converter for the environmental control system of the aircraft when connected to said environmental control system of the aircraft. The auxiliary power unit may be configured to be switched to a diode bridge to provide direct electrical energy to the second propulsive electric distribution sub-network.

The propulsive electric distribution network and the non-propulsive electric distribution networks can be segregated and galvanically isolated.

This allows to guarantee a network quality compatible with the normative constraints on the propulsive electric distribution networks, while limiting the filtering constraints on propulsive electric distribution networks, since the propulsive electric distribution networks only supply high-power equipment that are not very sensitive to the electromagnetic interference (EMI).

This also allows the non-propulsive electric distribution networks to be referenced to the structure of the aircraft, in order to facilitate the implementation of protections and to limit the mass of the wiring of the low power loads (by using the current return by the aircraft), while guaranteeing a high availability of the propulsive electric distribution networks using the propulsive electric distribution networks isolated from the aircraft.

The propulsive electric distribution networks and the electric distribution network coupled to loads of the electrified control system can be segregated and galvanically isolated.

The non-propulsive electric distribution networks may be alternative electric distribution networks. In this case, the non-propulsive electric distribution networks and the second alternative electric distribution sub-network can be synchronized and coupled in parallel.

The auxiliary power unit can be a fuel cell. In this case, the architecture comprises an electronic direct-to-direct power converter arranged between the auxiliary power unit and the propulsive electric distribution network.

BRIEF DESCRIPTION OF FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DESCRIPTION OF THE EMBODIMENTS

Figure 1:
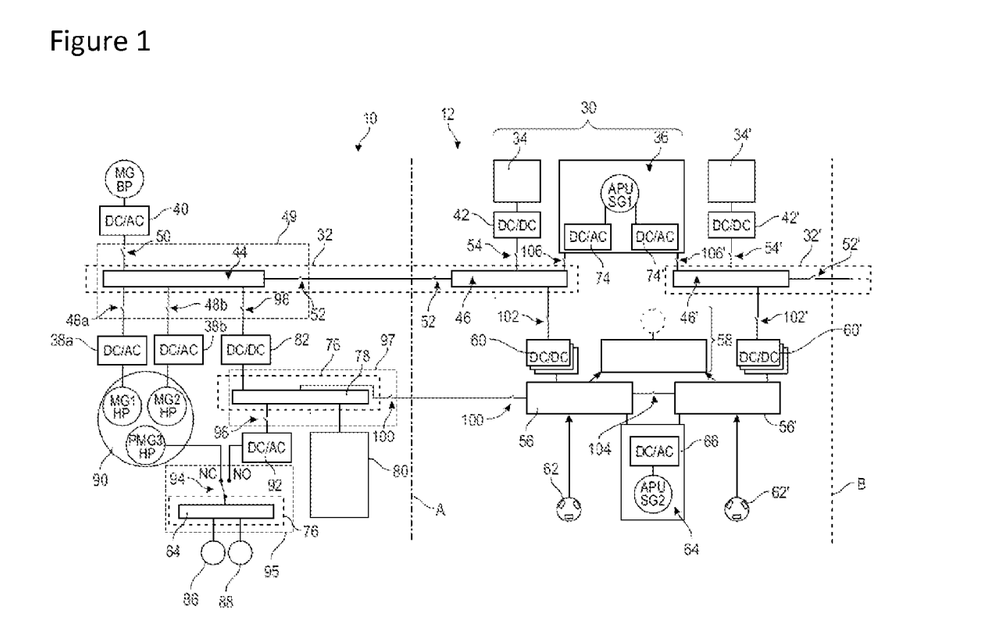
FIG. 1 schematically represents a hybrid propulsion architecture according to an embodiment of the invention, FIGS. 2 to 6 schematically represent embodiments of the first electric machines of the hybrid propulsion architecture according to the invention.

FIG. 1 shows an electric architecture for a twin-engine aircraft with hybrid thermal/electric propulsion. The architecture is here described and represented for only one of the two turboshaft engines of the aircraft, but is composed of two almost symmetrical portions associated with each turboshaft engine. Although not shown, the portion associated with the second turboshaft engine of the architecture is repeated in mirror image.

The architecture comprises a portion associated with the first turboshaft engine 10, a portion associated with the aircraft 12, and a portion associated with the second turboshaft engine (not shown). The dashed lines A, B represent the separation between the two turboshaft engines and the aircraft.

The architecture comprises two electric machines MG1 HP, MG2 HP mechanically coupled, by direct coupling or through a reduction gearbox, i.e. a gear system, to a high-pressure shaft of the turboshaft engine. Each electric machine MG1 HP, MG2 HP is configured to operate in a motor mode to provide mechanical propulsive power and in a generator mode to receive mechanical power and provide electrical power.

In other words, the electric machines MG1 HP, MG2 HP provide mechanical power injection and collection functions dedicated to the propulsive needs of the turboshaft engine, including the power injection for starting, and constituting a parallel hybridization of the turboshaft engine. The electric machines MG1 HP, MG2 HP also ensure electrical power generation functions (non-propulsive) for the needs of the aircraft and the turboshaft engine, in particular for the equipment of an electrified control system of the turboshaft engine.

The electric machines MG1 HP, MG2 HP are thus electric sources when they operate in generator mode, and loads when they operate in motor mode, in particular at the starting of the turboshaft engine.

The electric machines MG1 HP, MG2 HP can be mechanically coupled to the high-pressure shaft in direct connection. Alternatively, the electric machines MG1 HP, MG2 HP are mechanically coupled to the high-pressure shaft by means of an accessory gear box (AGB). The accessory gear box can be dedicated to the electric machines MG1 HP, MG2 HP. In particular, a bevel gearbox can be arranged between each electric machine MG1 HP, MG2 HP and the high-pressure shaft.

The electric machines MG1 HP, MG2 HP can be segregated from each other. In particular, as shown in FIGS. 2 to 6, different configurations are possible depending on the degree of segregation desired.

Figure 2:
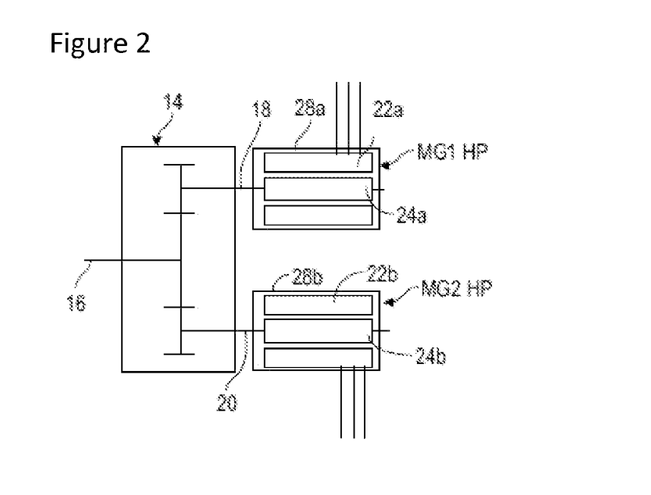

FIG. 2 shows the electric machines MG1 HP, MG2 HP mechanically coupled to the high-pressure shaft by means of an accessory gear box 14. The mechanical input 16 of the accessory gear box 14 is intended to be coupled to the high-pressure shaft. A first mechanical output 18 of the accessory gear box 14 is coupled to the electric machine MG1 HP, and a second mechanical output 20 of the accessory gear box 14 is coupled to the electric machine MG2 HP. Each electric machine MG1 HP, MG2 HP comprises a stator 22a, 22b, a rotor 24a, 24b, a casing 28a, 28b which is specific to it. The electric machines MG1 HP, MG2 HP are segregated from each other on the accessory gear box 14. The electric machines MG1 HP, MG2 HP may have different rotational speeds from the rotational speed of the high-pressure shaft according to the gear ratio set by the accessory gear box 14.

Figure 3:
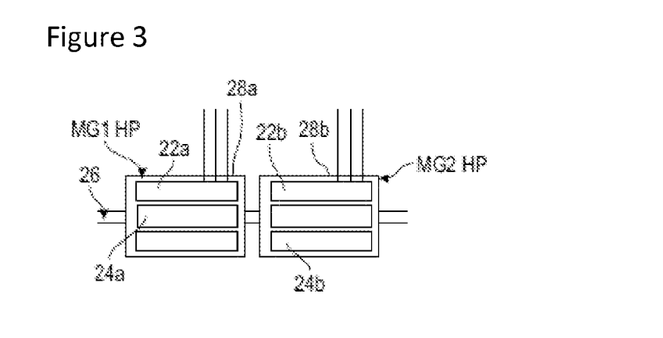

FIG. 3 shows the electric machines MG1 HP, MG2 HP mechanically coupled to the high-pressure shaft 26 in direct connection. The electric machines MG1 HP, MG2 HP rotate at the same speed as the high-pressure shaft. Each electric machine MG1 HP, MG2 HP comprises a stator 22a, 22b, a rotor 24a, 24b, and a casing 28a, 28b which is specific to it. The electric machines MG1 HP, MG2 HP are segregated from each other on the high-pressure shaft 26.

Figure 4:
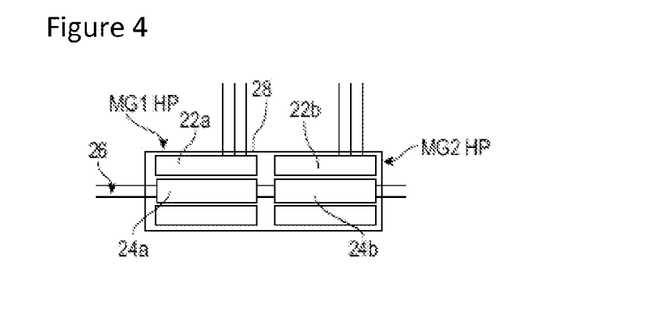

FIG. 4 shows the electric machines MG1 HP, MG2 HP mechanically coupled to the high-pressure shaft 26 in direct connection. Each electric machine MG1 HP, MG2 HP comprises its own stator 22a, 22b and rotor 24a, 24b, and a casing 28 which is common to both electric machines. The electric machines MG1 HP, MG2 HP are internally segregated from each other by means of magnetic and electric circuits (details not shown).

Figure 5:
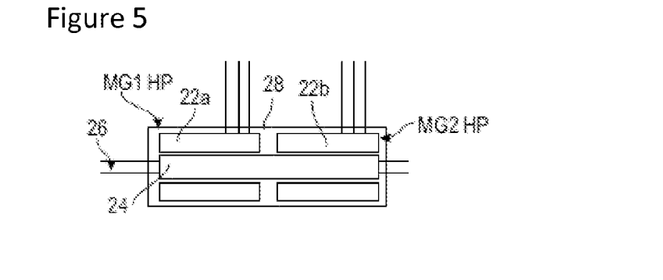
Figure 6:
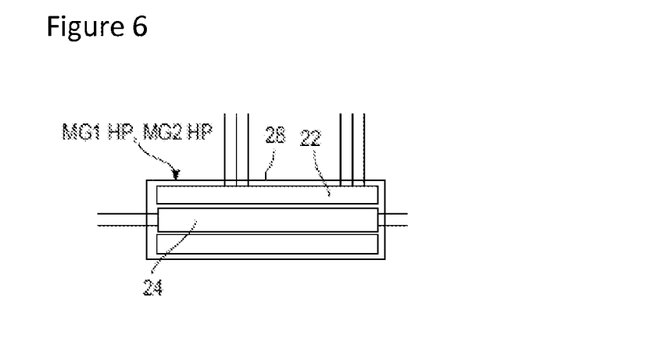

FIG. 5 shows the electric machines MG1 HP, MG2 HP mechanically coupled to the high-pressure shaft 26 in direct connection. Each electric machine MG1 HP, MG2 HP comprises its own stator 22a, 22b, and a rotor 24 and a casing 28 that are common to both electric machines, as well as a common rotor magnetic circuit (details of which are not shown). The electric machines MG1 HP, MG2 HP are magnetically and electrically segregated from each other on the stators 22a, 22b. FIG. 6 shows the electric machines MG1 HP, MG2 HP mechanically coupled to the high-pressure shaft 26 in direct connection. The electric machines MG1 HP, MG2 HP comprise a stator 22, a rotor 24 and a casing 28 which are common to both electric machines, as well as a common stator and rotor magnetic circuit (details of which are not shown). The electric machines MG1 HP, MG2 HP are electrically segregated from each other on the stator 22.

The architecture comprises at least one electric machine MG BP mechanically coupled, by direct coupling or through a reduction gearbox, to a low-pressure shaft of the turboshaft engine. Although not shown, the architecture may comprise a plurality of electric machines MG BP mechanically coupled to a low-pressure shaft of the turboshaft engine. Here, only one electric machine MG BP is shown. The electric machine MG BP is configured to operate in a motor mode to provide mechanical propulsive power and in a generator mode to receive mechanical power and provide electrical power.

In other words, the electric machine MG BP ensures functions of injection and collection of mechanical power dedicated to the propulsive needs of the turboshaft engine, and constituting a parallel hybridization of the turboshaft engine. The electric machine MG BP also ensures electrical power generation functions (non-propulsive) for the needs of the aircraft and of the turboshaft engine, in particular for equipment of the electrified control system of the to turboshaft engine.

The electric machine MG BP is an electric source when operating in generator mode, and a load when operating in motor mode.

The electric machine MG BP can be mechanically coupled to the low-pressure shaft in direct connection. Alternatively, the electric machine MG BP is mechanically coupled to the low-pressure shaft by means of an accessory gear box. The accessory gear box can be dedicated to electric machine MG BP. In particular, a bevel gearbox can be arranged between the electric machine MG BP and the low-pressure shaft.

The electric machines MG BP can be segregated from each other. In particular, depending on the desired degree of segregation, the different configurations shown in FIGS. 2 to 6 for the electric machines MG1 HP and MG2 HP are possible for the electric machines MG BP.

By analogy with FIG. 2, the electric machines MG BP can be mechanically coupled to the low-pressure shaft by means of an accessory gear box, the mechanical input of which is intended to be coupled to the low-pressure shaft. A first mechanical output of the accessory gear box is intended to be coupled to a first electric machine MG BP, and a second mechanical output of the accessory gear box is intended to be coupled to a second electric machine MG BP. Each electric machine MG BP can comprise a stator, a rotor, and a casing of its own. The electric machines MG BP can be segregated from each other on the accessory gear box. The electric machines MG BP can have different rotational speeds from the rotational speed of the high-pressure shaft depending on the gear ratio set by the accessory gear box.

By analogy with FIG. 3, the electric machines MG BP can be mechanically coupled to the low-pressure shaft in direct connection. The electric machines MG BP can rotate at the same speed as the low-pressure shaft. Each electric machine MG BP can comprise a stator, a rotor, and a casing of its own. The electric machines MG BP can be segregated from each other on the high-pressure shaft.

By analogy with FIG. 4, the electric machines MG BP can be mechanically coupled to the high-pressure shaft in direct connection. Each electric machine MG BP can comprise its own stator and rotor, and a casing that is common to both electric machines. The electric machines MG BP can be internally segregated from each other by means of magnetic and electric circuits.

By analogy with FIG. 5, the electric machines MG BP can be mechanically coupled to the high-pressure shaft in direct connection. Each electric machine MG BP can comprise its own stator, and a rotor and a casing that are common to both electric machines, as well as a common rotor magnetic circuit. The electric machines MG BP can be segregated from each other magnetically and electrically on the stators.

By analogy with FIG. 6, the electric machines MG BP can be mechanically coupled to the high-pressure shaft in direct connection. The electric machines MG BP can comprise a stator, a rotor and a casing which are common to both electric machines, as well as a common stator and rotor magnetic circuit. The electric machines MG BP can be electrically segregated from each other on the stator.

The architecture comprises auxiliary energy sources 30 in order to have additional sources (related to the notion of hybridization) during phases of power injection to the high-pressure and low-pressure shafts of the turboshaft engine, and to supply a propulsive electric distribution network 32 if the electric machines MG1 HP, MG2 HP, MG BP are not available (when the electric machines MG1 HP, MG2 HP, MG BP are used for the power injection and therefore cannot themselves provide energy, or when the turboshaft engine is shut down or has failed).

In particular, the auxiliary energy sources 30 are coupled to the propulsive electric distribution network 32 and configured to provide energy to the electric machines MG1 HP, MG2 HP, MG BP when these electric machines are operating in motor mode and to supply power to the propulsive electric distribution network 32 when the electric machines MG1 HP, MG2 HP, MG BP are not available.

The auxiliary energy sources 30 can be used even if the electric machines MG1 HP, MG2 HP, MG BP are theoretically available, for energy optimization or sizing purposes. For example, it may be less energetically costly to draw off energy from the auxiliary energy sources 30 than from the electric machines MG1 HP, MG2 HP, MG BP of the turboshaft engine in certain phases. Similarly, it may be cheaper to reduce the power of the electric machines MG1 HP, MG2 HP, MG BP (i.e., main electric machines), and use the auxiliary energy sources 30 (i.e., additional sources) to provide an additional energy.

The auxiliary energy sources 30 may comprise reversible energy storage elements 34, 34' (the storage element 34' being coupled to the electric distribution network 32' of the second turboshaft engine). The storage elements 34 may comprise batteries and/or super-capacitors. As shown in FIG. 1, the storage elements 34 are preferably arranged in the aircraft portion 12 of the architecture, not in the turboshaft engine portion 10. The storage elements 34 can be shared between the two portions associated with the turboshaft engines of the architecture. Alternatively, as shown in FIG. 1, the storage elements 34, 34' are independent for each turboshaft engine.

The auxiliary energy sources 30 may comprise one or more auxiliary electric machines APU SG1 that are auxiliary power units 36. The electric machines APU SG1 can be used to start these auxiliary power units 36. As shown in FIG. 1, the auxiliary electric machines APU SG1 can be arranged in the aircraft portion 12 of the architecture, and not in the turboshaft engine portion 10. The auxiliary electric machines APU SG1 can be shared between the two portions associated with the turboshaft engines of the architecture, as shown in FIG. 1. The sharing variants shown in FIGS. 4, 5 and 6 can be applied to the auxiliary electric machines APU SG1. In the alternative shown in FIGS. 2 and 3, the auxiliary electric machines APU SG1 can be independent for each turboshaft engine.

The auxiliary energy sources 30 may comprise one or more fuel cells (not shown). The fuel cells can be located in the aircraft, i.e. they are not arranged in the turboshaft engine. The fuel cells can be shared between the two portions associated with the turboshaft engines of the architecture, or can be independent for each turboshaft engine. In the architecture shown in FIG. 1, the fuel cells can replace the auxiliary power unit 36.

The architecture comprises electronic energy conversion means coupled to the electric machines MG1 HP, MG2 HP, MG BP, to the auxiliary energy sources 30 and to the propulsive electric distribution network 32. The electronic energy conversion means are associated with the auxiliary energy sources 30 to control the energy and the associated propulsive electric distribution network 32. The electronic energy conversion means (i.e. power electronics) comprise electronic power converters.

Each electric machine MG1 HP, MG2 HP is coupled to the propulsive electric distribution network 32 by at least one or more reversible electronic power converters 38a, 38b arranged in parallel. Since the propulsive electric distribution network 32 is a direct electric distribution network, these converters 38a, 38b are direct-alternative converters (DC/AC in FIG. 1, an acronym for "Direct Current", DC, and "Alternative Current", AC). These converters 38a, 38b ensure a function of control of the electrical power drawn off or sent to the electric machines MG1 HP, MG2 HP to ensure the functions of these.

The electric machine MG BP is coupled to the propulsive electric distribution network 32 by at least one or more reversible electronic power converters 40 arranged in parallel. Since the propulsive electric distribution network 32 is a direct electric distribution network, these converters 40 are DC/AC converters. These converters 40 ensure a control function of the electrical power drawn off or sent to the electric machine MG BP to ensure its functions.

The converters 38a, 38b, 40 are connected to the propulsive electric distribution network 32 providing the necessary power or transferring the electrical power from the electric machines MG1 HP, MG2 HP, MG BP to the storage elements 34, 34' or to consumers (i.e. loads). These converters 38a, 38b, 40 also participate in the stabilization of the propulsive electric distribution network 32. These converters 38a, 38b, 40 can be located in the vicinity, and in particular as close as possible (for example integrated), to the electric machines MG1 HP, MG2 HP, MG BP. Alternatively, these converters 38a, 38b, 40 can be arranged remotely from the electric machines MG1 HP, MG2 HP, MG BP, i.e., relocated to another location in the turboshaft engine, for example, in the compartment of the fan, in the core or in a pylon of the turboshaft engine, or in the aircraft (i.e., outside the turboshaft engine).

When the storage elements 34, 34' are super-capacitors, the latter are connected to the propulsive electric distribution network 32, 32' by one or more reversible electronic direct-to-direct power converters 42, 42' (DC/DC in FIG. 1). These converters 42, 42' ensures a function of controlling the electrical energy drawn off or sent to the storage elements 34, 34' to ensure the functions of the latter. These converters 42, 42' may also participate in the stabilization of the propulsive electric distribution network 32, 32'.

When the storage elements 34, 34' are batteries, the latter may be connected to the propulsive electric distribution network 32, 32' by one or more reversible electronic DC/DC power converters 42, 42' (the converter 42' being coupled to the propulsive electric distribution network 32' and to the storage elements 34' associated with the second turboshaft engine). Alternatively, the batteries can be coupled directly to the propulsive electric distribution network 32, 32'.

The architecture thus comprises, for each turbomachine, a high-voltage direct propulsive electric distribution network 32, 32'. The propulsive electric distribution network 32, 32' is intended to supply equipment related to the propulsion system.

The electric machines MG1 HP, MG2 HP, MG BP and the auxiliary energy sources 30 are connected to the propulsive electric distribution network 32, 32', possibly by means of their converters 38a, 38b, 40, 42, 42'. The voltage U of the propulsive electric distribution network 32, 32' is controlled around a predetermined value between 540 V DC and 1000 V DC, in versions 0 V DC and +U VDC, or ±U/2 V DC. The control of the voltage of the propulsive electric distribution network 32, 32' is ensured by the converters 38a, 38b, 40, 42, 42', 74, 74'.

The propulsive electric distribution network 32, 32' comprises a first propulsive electric distribution sub-network 44 located in the turboshaft engine and to which are connected in parallel the electric machines MG1 HP, MG2 HP, MG BP associated with their converters 38a, 38b, 40. In FIG. 1, the first propulsive electric distribution sub-network 44 is arranged in the turboshaft engine portion 10 of the architecture, not in the aircraft portion 12.

Figure 7:
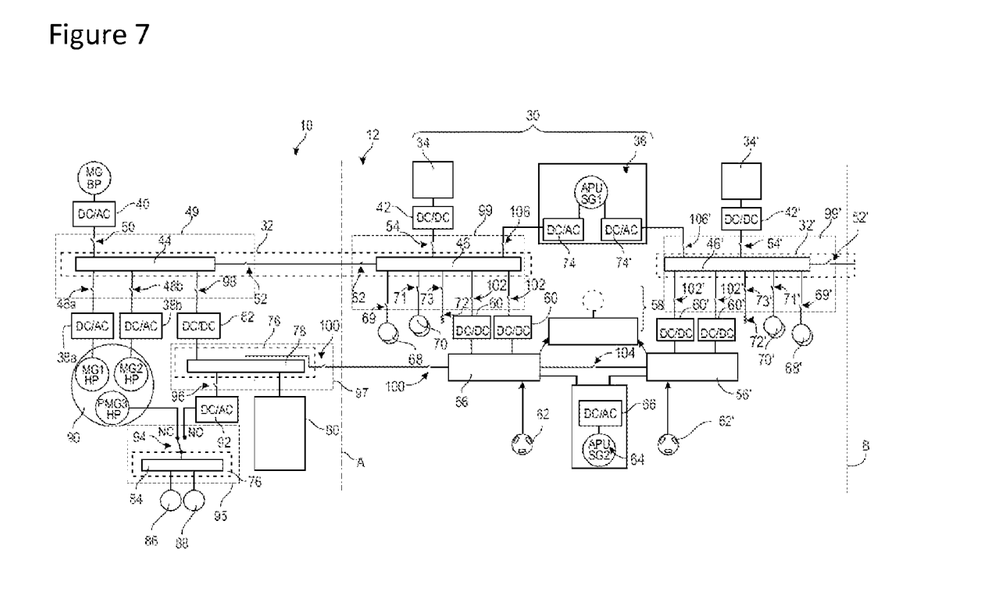
FIG. 7 shows schematically a hybrid propulsion architecture according to another embodiment of the invention.
Figure 8:
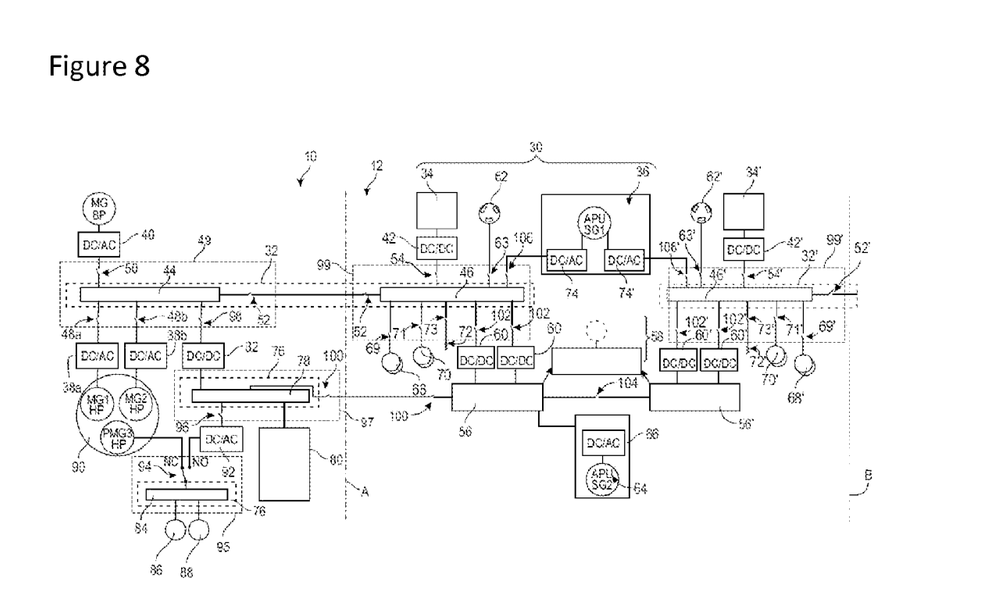
FIG. 8 shows schematically a hybrid propulsion architecture according to another embodiment of the invention.

Isolation and cut-off means 48a, 48b, 50 are arranged between each electric machine MG1 HP, MG2 HP, MG BP and the first propulsive electric distribution sub-network 44 so as to allow or interrupt the connection between each electric machine MG1 HP, MG2 HP, MG BP with its associated converter and the propulsive electric distribution network 32, 32'. The isolation and cut-off means 48a, 48b, 50 have functions of reconfiguring and protecting the first propulsive electric distribution sub-network 44. The isolation and cut-off means 48a, 48b, 50 may be installed in a local distribution box 49, as shown in FIGS. 1, 7 and 8.

The propulsive electric distribution network 32, 32' also comprises a second propulsive electric distribution sub-network 46, 46' located in the aircraft and to which the auxiliary energy sources 30 associated with their converters 42, 42', 74, 74' are connected. In FIG. 1, the second propulsive electric distribution sub-network 46, 46' is arranged in the aircraft portion 12 of the architecture, not in the turboshaft engine portion 10.

Isolation and cut-off means 52 are arranged between the propulsive electric distribution sub-networks 44, 46 (the isolation and cut-off means 52' being arranged between the propulsive electric distribution sub-networks of the propulsive electric distribution network 32' of the second turboshaft engine). These isolation and cut-off means 52 are configured to allow or interrupt the connection between the propulsive electric distribution sub-networks 44, 46. The isolation and cut-off means 52 have functions to reconfigure and protect the propulsive electric distribution sub-networks 44, 46.

Isolation and cut-off means 54, 54' are arranged between the storage elements 34, 34' (and the associated converters 42, 42') and the propulsive electric distribution sub-networks 46, 46' (the isolation and cut-off means 54' being coupled between the storage elements 34' and the propulsive electric distribution network 32' of the second turboshaft engine). These isolation and cut-off means 54 are configured to allow or interrupt the connection between the storage elements 34 and the propulsive electric distribution sub-network 46.

As shown in FIG. 1, the propulsive electric distribution networks 32, 32' of the turboshaft engines are independent and segregated. The propulsive electric distribution sub-network 46 of the first turboshaft engine cannot be directly connected to the propulsive electric distribution sub-network 46' of the second turboshaft engine.

Alternatively (not shown), the propulsive electric distribution networks 32, 32' of the turboshaft engines are connected to each other. Isolation and cut-off means are arranged between the propulsive electric distribution networks 32, 32' of the turboshaft engines, and are configured to enable or disable the connection between the propulsive electric distribution networks 32, 32' of the turboshaft engines. These isolation and cut-off means have functions of reconfiguring and protecting the propulsive electric distribution networks 32, 32' of the turboshaft engines. The connection between the propulsive electric distribution networks 32, 32' of the turboshaft engines can be in an open or closed state. The propulsive electric distribution networks 32, 32' of the turboshaft engines can be directly electrically connected and exchange electrical power. For example, storage elements 34' of the propulsive electric distribution network 32' of the second turboshaft engine may contribute to the providing of power to an electric machine MG1 HP, MG2 HP, MG BP of the first turboshaft engine 10.

The architecture comprises a non-propulsive electric distribution network 56, 56' (the network 56' being the non-propulsive electric distribution network associated with the second turboshaft engine) configured to supply loads of the aircraft. The non-propulsive electric distribution networks 56, 56' are segregated. Isolation and cut-off means 104 may be arranged between the non-propulsive electric distribution networks 56, 56' so as to allow or interrupt the connection between the non-propulsive electric distribution networks 56, 56'. The isolation and cut-off means 104 have functions of reconfiguring and protecting the non-propulsive electric distribution networks 56, 56'.

The aircraft may further comprise a backup (or emergency) non-propulsive electric distribution network 58. The backup non-propulsive electric distribution network 58 is independent of the non-propulsive electric distribution networks 56, 56'. The backup non-propulsive electric distribution network 58 may be supplied by the non-propulsive electric distribution networks 56, 56'.

The non-propulsive electric distribution networks 56, 56' supply, through the propulsive electric distribution sub-networks 46, 46' and the converters 60, 60', the loads of the aircraft.

As depicted in FIGS. 1 and 7, the non-propulsive electric distribution networks 56, 56' may be supplied by external sources 62, 62' and/or by one or more auxiliary electric machines APU SG2 that are coupled to one or more auxiliary power units 64 and/or by the propulsive electric distribution sub-networks 46, 46', via the converters 60, 60'. The auxiliary power unit 64 can be confused with the auxiliary power unit 36, on which a plurality of electric machines of the starter-generator type are installed.

As depicted in FIG. 8, the propulsive electric distribution sub-networks 46, 46' may be supplied directly from the external sources 62, 62'. Isolation and cut-off means 63, 63' may be arranged between the propulsive electric distribution sub-network 46, 46' and the external sources 62, 62', so as to allow or interrupt the connection between the external sources 62, 62' and the propulsive electric distribution networks 46, 46'.

As shown in FIG. 1, the auxiliary electric machines APU SG2 can be arranged in the aircraft portion 12 of the architecture, and not in the turboshaft engine portion 10. The auxiliary electric machines APU SG2 can be shared between the two portions associated with the turboshaft engines of the architecture, as shown in FIG. 1. Alternatively, the auxiliary electric machines APU SG2 can be independent for each turboshaft engine. As shown in FIG. 8, the auxiliary electric machine APU SG2 is connected only to the non-propulsive electric distribution network 56. The auxiliary electric machines APU SG2 can be coupled to one or more electronic DC/AC power converters 66.

The connection between the propulsive electric distribution network 32 and the non-propulsive electric distribution network 56 may be realized by means of one or more electronic power converters 60, 60' (the converters 60' being connected to the propulsive 32' and non-propulsive 56' electric distribution networks associated with the second turboshaft engine) connected in parallel. These converters 60, 60' can be reversible or non-reversible.

Isolation and cut-off means 102, 102' may be arranged between the propulsive electric distribution sub-network 46, 46' and the converter 60, 60' (the isolation and cut-off means 102' being connected to the propulsive electric distribution network 32' and to the converters 60' associated with the second turboshaft engine), so as to enable or disable the connection between the electric distribution networks 32, 56. The isolation and cut-off means 102 have functions of reconfiguring and protecting the electric distribution networks 32, 56.

The non-propulsive electric distribution network 56, 56' may be a DC or AC electric distribution network.

The converters 60, 60' can therefore be DC/DC or DC/AC converters. In FIG. 1, the converters 60, 60' are DC/DC converters.

When the non-propulsive electric distribution network 56, 56' is a DC electric distribution network, the converters 60, 60' may have a galvanic isolation, and thus be isolated converters. This allows to ensure that certain types of defects do not propagate from one electric distribution network to the other.

When the non-propulsive electric distribution network 56, 56' is an AC electric distribution network, the converters 60, 60' are DC/AC converters, with a galvanic isolation. This allows to synchronize in phase and frequency the non-propulsive electric distribution network 56, 56' with the auxiliary power unit 64 (which then does not require an associated electronic power converter). The auxiliary power unit 64 can then be AC generator. This synchronization can allow: either to carry out a transition of the NBPT type (No Break Power Transfer) between the two sources (converters 60, 60' and auxiliary electric machines APU SG2), which allows not to cut off the electrical power supply to the loads of the aircraft during the source change, or to use the two sources in parallel.

The isolated converters (isolated DC/DC or isolated DC/AC) allow the potential of the non-propulsive electric distribution network 56, 56' to be referenced to the structure of the aircraft, i.e., to the mechanical mass of the aircraft. This allows the use of the structure of the aircraft to ensure the current feedback for the low power loads (e.g. single-phase AC, or 0 V/+270 V or 0 V/−270 V DC). This also allows to ensure a simple, fast and effective protection (e.g. by circuit breaker, or RCCB (Remote-Current Circuit Breaker), or by fuses) of the non-propulsive electric distribution network 56, 56' in case of defect. In addition, this allows to choose a referencing of the propulsive electric distribution network 32, 32' to ground of the aircraft that is different from that of the non-propulsive electric distribution network 56, 56': the impedant electric distribution network with respect to ground allowing to ensure a greater availability of the propulsive electric distribution network 32, 32', and the electric distribution network referenced to ground allowing to ensure an easier protection of the propulsive electric distribution network 32, 32'.

As shown in FIGS. 7 and 8, which represent variations of the architecture of FIG. 1, some of the aircraft loads 68, 70, 72, 68', 70', 72' may also be supplied directly from the propulsive electric distribution network 32, 32' (the loads 68', 70', 72' being coupled to the propulsive electric distribution network 32' of the second turboshaft engine), and in particular from the propulsive electric distribution sub-network 46. Advantageously, when a portion of the loads is supplied by the propulsive electric distribution network 32, 32', the external sources 62, 62' are disconnected, by means of the isolation and cut-off means 63, 63', from the propulsive electric distribution network 32, 32'.

The loads 68, 70, 72 may comprise a WIPS (Wing Ice Protection System), an ECS (Environmental Control System), which controls the pressure and the temperature of the cabin of the aircraft, or an etaxi (an electric wheel taxing system). If the propulsive electric distribution network 32 has a higher voltage than the non-propulsive electric distribution network 56, the higher power loads can advantageously be supplied from the propulsive electric distribution network 32, so as to limit the currents flowing through the harnesses supplying the loads, reduce the power of the isolated DC/DC converters, and use the higher efficiency supply paths.

As shown in FIGS. 7 and 8, isolation and cut-off means 69, 69' may be arranged between the propulsive electric distribution sub-network 46, 46' and the loads 68, 68', so as to enable or disable the connection between the propulsive electric distribution network 32 and the loads 68, 68'.

As shown in FIGS. 7 and 8, isolation and cut-off means 71, 71' may be arranged between the propulsive electric distribution sub-network 46, 46' and the loads 70, 70', so as to enable or disable the connection between the propulsive electric distribution network 32 and the loads 70, 70'.

As shown in FIGS. 7 and 8, isolation and cut-off means 73, 73' may be arranged between the propulsive electric distribution sub-network 46, 46' and the loads 72, 72', so as to enable or disable the connection between the propulsive electric distribution network 32 and the loads 72, 72'.

As shown in FIG. 1, the auxiliary electric machines APU SG1 are starter-generators of the auxiliary power units 36, and are connected to the propulsive electric distribution network 32, 32' via electronic DC/AC power converters 74, 74' of the starter-generators (the converter 74' being coupled to the propulsive electric distribution network 32' of the second turboshaft engine). The connections between the auxiliary electric machines APU SG1 and each converter 74, 74' can be of the three-phase type, i.e., comprising three wires as shown at the start of the stators 22a, 22b and 22 in FIGS. 2 to 6. When the auxiliary energy source 30 is a fuel cell, the converters 74, 74' are DC/DC converters. The converter 74 is dedicated to starting the auxiliary power unit 36 (in startup mode), and, once the auxiliary power unit 36 is started, is used to provide power to the propulsive electric distribution network 32 (in generation mode).

The converter 74 can be shared for other functions, in particular for driving other electric motors of the aircraft. Specifically, the converter 74 may be used as a start-up converter for the auxiliary power unit 36, and then, once the auxiliary power unit 36 is started and controlled at a constant speed (by a computer of the auxiliary power unit 36), a diode bridge arranged between the auxiliary electric machine APU SCG1 and the propulsive electric distribution network 32 may be used to provide a DC voltage to the propulsive electric distribution network 32. The other converters 38a, 38b, 40, 42, 60 on the propulsive electric distribution network 32 then allow to control the voltage, and thus control the power and energy flows. When the auxiliary power unit 36 is not operational, in particular when the aircraft is in flight, or when the auxiliary power unit 36 is providing electrical power via the diode bridge, then the converter 74 is available and can be used to supply other electric machines of the aircraft, such as compressors in an aircraft air conditioning system.

Figure 9:
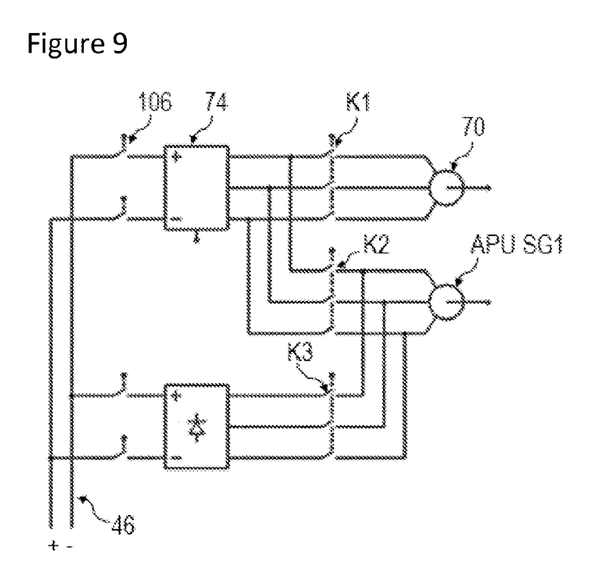
FIG. 9 shows schematically the sharing of an electronic power converter between an auxiliary electric machine and a load of the aircraft.

FIG. 9 shows a schematic diagram of the sharing of the converter 74 between the auxiliary electric machine APU SG1 and a load (the ECS) 70. When the switch K1 is open, the switch K2 is closed and the switch K3 is open, the converter 74, in this case an inverter, controls the starting of the auxiliary electric machine APU SG1. When the switch K1 is open, the switch K2 is open, and the switch K3 is closed, the propulsive electric distribution sub-network 46 is supplied by the auxiliary electric machine APU SG1. When the switch K1 is closed, the switch K2 is open and the switch K3 is closed, the converter 74 can be used to supply and control the ECS 70. According to the invention, the use of the diode bridge allows to provide a direct power supply network, and not an alternative network. In addition, the converter 74 is shared with the auxiliary electric machine APU SG1, and not with a starter-generator of the main power supply. In addition, these functions are redundant in the architecture, allowing the auxiliary electric machine APU SG1 to be restarted in flight of the aircraft by one of the converters 74, 74', cutting off only a portion of the ECS 70, 70', or using the converter 66 to not cut off the ECS 70, 70'.

As shown in FIGS. 1 and 7, isolation and cut-off means 106, 106' may be arranged between the propulsive electric distribution sub-network 46, 46' and the converters 74, 74' (the isolation and cut-off means 106' being coupled to the propulsive electric distribution network 32' and to the converter 74' associated with the second turboshaft engine), so as to enable or disable the connection between the propulsive electric distribution network 32 and the auxiliary power unit 36. The isolation and cut-off means 52, 54, 63, 69, 71, 73, 102, 106 may be installed in a local distribution box 99, as shown in FIGS. 7 and 8. Similarly, the isolation and cut-off means 52', 54', 63', 69', 71', 73', 102', 106' may be installed in a local distribution box 99', as shown in FIGS. 7 and 8.

Each turboshaft engine is equipped with an electrified control system (or MEE, an acronym for "More Electric Engine"). Thus, a certain number of equipment such as actuators, pumps, or computers, which are present in the turboshaft engines must be supplied.

The architecture comprises an electric distribution network 76 coupled to electrified control system loads.

The electric distribution network 76 comprises a high voltage direct electric distribution sub-network 78 dedicated to a portion of the loads 80 of the electrified control system. For example, the electric distribution sub-network 78 can be dedicated to variable geometries, or TRAS (acronym for "Thrust Reverser Actuation System"), or NAI (acronym for "Nacelle Anti-Icing"). The voltage of the electric distribution sub-network 78 may be less than or equal to the voltage of the propulsive electric distribution network 32.

The electric distribution sub-network 78 may be supplied by the propulsive electric distribution network 32. An electronic DC/DC power converter 82 may be coupled between the electric distribution sub-network 78 and the propulsive electric distribution network 32. The converter 82 may have galvanic isolation, and thus be an isolated converter.

Isolation and cut-off means 98 may be arranged between the propulsive electric distribution sub-network 44 and the converter 82, so as to enable or disable the connection between the electric distribution sub-network 78 and the propulsive electric distribution sub-network 44. The isolation and cut-off means 98 have functions of reconfiguring and protecting the electric distribution sub-networks 78, 44.

The electric distribution sub-network 78 may be supplied by the non-propulsive electric distribution network 56, in the phases when the propulsive electric distribution network 32 is not available. Depending on the non-propulsive electric distribution network 56 under consideration (AC or DC), one or more electronic power converters (not shown) may be arranged between the non-propulsive electric distribution network 56 and the electric distribution sub-network 78.

When the non-propulsive electric distribution network 56 is a direct electric distribution network, the electronic power converters are DC/DC converters. When the non-propulsive electric distribution network 56 is an AC electric distribution network, the electronic power converters are DC/AC converters. Isolation and cut-off means 100 may be arranged between the electric distribution sub-network 78 and the non-propulsive electric distribution network 56, so as to allow or interrupt the connection between the electric distribution sub-network 78 and the non-propulsive electric distribution network 56. The isolation and cut-off means 100 have functions of reconfiguring and protecting the electric distribution networks 76, 56.

The electric distribution network 76 comprises an alternative electric distribution sub-network 84, the frequency and voltage levels of which are proportional to the speed of the high-pressure shaft of the turboshaft engine (constant voltage/frequency ratio, otherwise referred to as "constant V/F"). The electric distribution sub-network 84 is dedicated to a portion of the loads 86 of the electrified control system. Preferably, the electric distribution sub-network 84 is dedicated to motor pump type loads, such as a fuel pump 86 or an oil pump 88. The electric distribution sub-network 84 may be supplied by a dedicated electric machine PMG3 HP mechanically coupled to the high-pressure shaft of the turboshaft engine (also referred to as dedicated generator for the control functions). This electric machine PMG3 HP can be a permanent magnet machine (PMG, acronym for "Permanent Magnet Generator"). This allows to obtain a nearly constant V/F ratio, without the need for power electronics. The active portions of the permanent magnet machine PMG3 HP can be located within the same casing 90 as the electric machines MG1 HP, MG2 HP, as shown in FIG. 1. The electric distribution sub-network 84 may be supplied by the electric distribution sub-network 78, via one or more electronic DC/AC power converters 92 arranged in parallel.

The converter 92 may supply the electric distribution sub-network 84 with other voltage and frequency characteristics proportional to the speed of the high-pressure shaft of the turboshaft engine. This allows for specific operating modes of the loads directly connected to the electric distribution sub-network 84, in particular a speed control independent of the speed of the high-pressure shaft of the turboshaft engine for certain motor-pump type loads (variable speed or constant speed at low speed). This also allows optimized sizing of these motor pumps and associated systems.

Alternatively, the converter 92 may supply the electric distribution sub-network 84 with "constant V/F" characteristics as a redundancy to the electromechanical conversion solution. This redundancy can provide a power identical to the nominal level that the generator dedicated to the control functions would be able to provide, or a lower power with a degraded level of performance, but guaranteeing a sufficient operability of the turboshaft engine.

Isolation and cut-off means 94, such as a two-position contactor, allow a choice between a supply from the dedicated electric machine PMG3 HP and a supply from the electric distribution sub-network 78, via the converter 92. In particular, the isolation and cut-off means 94 are configured to switch from a first configuration in which the electric distribution sub-network 84 is coupled to the electric machine PMG3 HP so as to be supplied by the latter, to a second configuration in which the electric distribution sub-network 84 is coupled to the electric distribution sub-network 78, via the converter 92, so as to be supplied by the latter, and vice versa. In FIG. 1, the isolation and cut-off means 94 are shown in a normally closed (NC) position as supplying the electric distribution sub-network 84 from the electric machine PMG3 HP. Of course, the isolation and cut-off means 94 could be, in a normally open (NO) position as supplying power to the electric distribution sub-network 84 from the electric distribution sub-network 78. The isolation and cut-off means 94 may be installed in a local distribution box 95, as shown in FIGS. 1, 7 and 8.

Isolation and cut-off means 96 may be arranged between the electric distribution sub-network 78 and the converter 92, so as to enable or disable the connection between the electric distribution sub-network 78 and the electric distribution sub-network 84. The isolation and cut-off means 96 have functions of reconfiguring and protecting the electric distribution sub-networks 78, 84. The isolation and cut-off means 96, 100 may be installed in a local distribution box 97, as shown in FIGS. 1, 7 and 8.

The invention has been described primarily for one of the two turboshaft engines of the twin-engine aircraft. Of course, these characteristics apply to the other mirrored turboshaft engine.

The invention has been described primarily for a dual-body turbomachine, comprising a high-pressure (HP) body and a low-pressure (LP) body. Of course, the architecture according to the invention can be integrated into a three-body turbomachine, comprising a high-pressure body, a low-pressure body and an intermediate pressure body. On a three-body turbomachine, the electric machines are coupled to the HP and LP shafts.

The invention claimed is:

1. An electric architecture for a hybrid thermal/electric propulsion aircraft, said aircraft comprising two turboshaft engines, each turboshaft engine being provided with an electrified control system, and for each turboshaft engine, said electric architecture comprises:
    a high-voltage direct propulsive electric distribution network,
    a non-propulsive electric distribution network coupled to loads of the aircraft or to turboshaft engines,
    a plurality of first electric machines (MG1 HP, MG2 HP) mechanically coupled to a high-pressure shaft of said turboshaft engine, each of said first electric machines being configured to operate in a motor mode to provide mechanical propulsive power and in a generator mode to receive mechanical power and provide electrical power,
    at least one second electric machine (MG BP) mechanically coupled to a low-pressure shaft of said turboshaft engine and configured to operate in a motor mode to provide mechanical propulsive power and in a generator mode to receive mechanical power and provide electrical power,
    at least one auxiliary energy source coupled to said propulsive electric distribution network and configured to provide energy to said first and second electric machines (MG1 HP, MG2 HP, MG BP) when said first and/or second electric machines are operating in a motor mode and to supply said propulsive electric distribution network,
    electronic energy conversion means coupled to said first and second electric machines (MG1 HP, MG2 HP, MG BP), to the auxiliary energy source and to said propulsive electric distribution network,
    an electric distribution network coupled to loads of said electrified control system, and
    at least one third electric machine (PMG3 HP) mechanically coupled to said high-pressure shaft and configured to operate in a generator mode to receive mechanical power and provide electrical power, said third electric machine (PMG3 HP) being dedicated to said electric distribution network coupled to loads of said electrified control system.

2. The electric architecture according to claim 1, wherein the electric distribution network coupled to loads of the electrified control system comprises:
    a first direct electric distribution sub-network, said first direct electric distribution sub-network being configured to be supplied by said propulsive electric distribution network or by said non-propulsive electric distribution network, and
    a second alternative electric distribution sub-network, and
    the architecture also comprises isolation and cut-off means configured to switch from a first configuration in which said second alternative electric distribution sub-network is coupled to said third electric machine (PMG3 HP) so as to be supplied by said third electric machine to a second configuration in which said second alternative electric sub-network is coupled to said first direct electric distribution sub-network, via at least one electronic power converter, so as to be supplied by said first direct electric distribution sub-network, and vice versa.

3. The electric architecture according to claim 1, comprising at least one electronic power converter connecting said propulsive electric distribution network and said non-propulsive electric distribution network.

4. The electric architecture according to claim 1, comprising at least one electronic power converter connecting said propulsive electric distribution network and said electric distribution network coupled to loads of said electrified control system.

5. The electric architecture according to claim 1, wherein, the first electric machines (MG1 HP, MG2 HP) are mechanically coupled to the high-pressure shaft in direct connection or by means of a first accessory gear box, and the second electric machine (MG BP) is mechanically coupled to the low-pressure shaft in direct connection or by means of a second accessory gear box.

6. The electric architecture according to claim 1, wherein the first electric machines (MG1 HP, MG2 HP) are segregated from each other.

7. The electric architecture according to claim 1, wherein the propulsive electric distribution network comprises:
- a first propulsive electric distribution sub-network coupled to the first and second electric machines (MG1 HP, MG2 HP, MG BP), and
- a second propulsive electric distribution sub-network coupled to said auxiliary energy source,
- the architecture further comprising isolation and cut-off means arranged between the first and second propulsive electric distribution sub-networks and configured to enable or disable the connection between said first and second propulsive electric distribution sub-networks.

8. The electric architecture according to claim 1, wherein the propulsive electric distribution network is configured to directly supply a portion of the loads of the aircraft.

9. The electric architecture according to claim 1, comprising at least one auxiliary power unit coupled with a starter-generator, said auxiliary power unit being coupled to the propulsive electric distribution network, via at least one electronic DC/AC converter and wherein said electronic power converter is configured to provide power to the starter-generator to start the auxiliary power unit and to provide power to the propulsive electric distribution network when the auxiliary power unit is started.

10. A hybrid thermal/electric propulsion aircraft comprising two turboshaft engines, each turboshaft engine comprising at least one high-pressure shaft and one low-pressure shaft, and for each turboshaft engine, said hybrid thermal/electric propulsion aircraft comprises an electric architecture according to claim 1.

11. The hybrid thermal/electric propulsion aircraft of claim 10, wherein the propulsive electric distribution network of a first turboshaft engine is coupled to the propulsive electric distribution network of a second turboshaft engine, and the aircraft further comprises isolation and cut-off means arranged between said propulsive electric distribution networks of the first and second turboshaft engines and configured to enable or disable the connection between said propulsive electric distribution networks of the first and second turboshaft engines.

12. The hybrid thermal/electric propulsion aircraft of claim 10, wherein the propulsive electric distribution networks of the first and second turboshaft engines are independent and segregated.

13. The hybrid thermal/electric propulsion aircraft of claim 10, further comprising a backup non-propulsive electric distribution network, and wherein the non-propulsive electric distribution network of a first turboshaft engine is segregated from the non-propulsive electric distribution network of a second turboshaft engine.

14. The hybrid thermal/electric propulsion aircraft according to claim 10, wherein the propulsive electric distribution network comprises:
- a first propulsive electric distribution sub-network coupled to the first and second electric machines (MG1 HP, MG2 HP, MG BP), and
- a second propulsive electric distribution sub-network coupled to said auxiliary energy source,
- the architecture further comprising isolation and cut-off means arranged between the first and second propulsive electric distribution sub-networks and configured to enable or disable the connection between said first and second propulsive electric distribution sub-networks, and at least one auxiliary power unit coupled with a starter-generator, said auxiliary power unit being coupled to the propulsive electric distribution network, via at least one electronic DC/AC converter and wherein said electronic power converter is configured to provide power to the starter-generator to start the auxiliary power unit and to provide power to the propulsive electric distribution network when the auxiliary power unit is started,
wherein the loads comprise an environmental control system of the aircraft, and wherein the electronic power converter is configured to operate as a starter for the auxiliary power unit, and as an electronic power converter of the environmental control system of the aircraft when connected to said environmental control system of the aircraft, and wherein the auxiliary power unit is configured to be switched to a diode bridge to provide direct electrical energy to the second propulsive electric distribution sub-network.

15. The hybrid thermal/electric propulsion aircraft of claim 10, wherein the propulsive electric distribution networks and the non-propulsive electric distribution networks are segregated and galvanically isolated.

16. The hybrid thermal/electric propulsion aircraft of claim 10, wherein the propulsive electric distribution networks and the electric distribution network coupled to loads of the electrified control system are segregated and galvanically isolated.

17. The hybrid thermal/electric propulsion aircraft of claim 10 wherein the electric distribution network coupled to loads of the electrified control system comprises:
- a first direct electric distribution sub-network, said first direct electric distribution sub-network being configured to be supplied by said propulsive electric distribution network or by said non-propulsive electric distribution network, and
- a second alternative electric distribution sub-network, and the architecture also comprises isolation and cut-off means configured to switch from a first configuration in which said second alternative electric distribution sub-network is coupled to said third electric machine (PMG3 HP) so as to be supplied by said third electric machine to a second configuration in which said second alternative electric sub-network is coupled to said first direct electric distribution sub-network, via at least one electronic power converter, so as to be supplied by said first direct electric distribution sub-network, and vice versa, wherein the non-propulsive electric distribution networks are alternative electric distribution networks, and wherein the non-propulsive electric distribution networks and the second alternative electric distribution sub-network are synchronized and coupled in parallel.

18. The hybrid thermal/electric propulsion aircraft according to claim 10, comprising at least one auxiliary power unit coupled with a starter-generator, said auxiliary power unit being coupled to the propulsive electric distribution network, via at least one electronic DC/AC converter and wherein said electronic power converter is configured to provide power to the starter-generator to start the auxiliary power unit and to provide power to the propulsive electric distribution network when the auxiliary power unit is started, wherein the auxiliary power unit is a fuel cell, and wherein the architecture comprises an electronic direct-to-direct power converter arranged between the auxiliary power unit and the propulsive electric distribution network.

19. An electric architecture for a hybrid thermal/electric propulsion aircraft, said aircraft comprising two turboshaft engines being of the more electric engines type, each turboshaft engine being provided with an electrified control system, and for each turboshaft engine, said electric architecture comprises:
- a high-voltage direct propulsive electric distribution network,
- a non-propulsive electric distribution network coupled to loads of the aircraft or to turboshaft engines,
- a plurality of first electric machines (MG1 HP, MG2 HP) mechanically coupled to a high-pressure shaft of said turboshaft engine, each of said first electric machines being configured to operate in a motor mode to provide mechanical propulsive power and in a generator mode to receive mechanical power and provide electrical power,
- at least one second electric machine (MG BP) mechanically coupled to a low-pressure shaft of said turboshaft engine and configured to operate in a motor mode to provide mechanical propulsive power and in a generator mode to receive mechanical power and provide electrical power,
- at least one auxiliary energy source coupled to said propulsive electric distribution network and configured to provide energy to said first and second electric machines (MG1 HP, MG2 HP, MG BP) when said first and/or second electric machines are operating in a motor mode and to supply said propulsive electric distribution network,
- electronic energy conversion means coupled to said first and second electric machines (MG1 HP, MG2 HP, MG BP), to the auxiliary energy source and to said propulsive electric distribution network,
- an electric distribution network coupled to loads of said electrified control system, and
- at least one third electric machine (PMG3 HP) mechanically coupled to said high-pressure shaft and configured to operate in a generator mode to receive mechanical power and provide electrical power, said third electric machine (PMG3 HP) being dedicated to said electric distribution network coupled to loads of said electrified control system.

20. An electric architecture for a hybrid thermal/electric propulsion aircraft, said aircraft comprising two turboshaft engines, each turboshaft engine being provided with an electrified control system, and for each turboshaft engine, said electric architecture comprises:
- a high-voltage direct propulsive electric distribution network,
- a non-propulsive electric distribution network coupled to loads of the aircraft or to turboshaft engines,
- a plurality of first electric machines (MG1 HP, MG2 HP) mechanically coupled to a high-pressure shaft of said turboshaft engine, each of said first electric machines being configured to operate in a motor mode to provide mechanical propulsive power and in a generator mode to receive mechanical power and provide electrical power,
- at least one second electric machine (MG BP) mechanically coupled to a low-pressure shaft of said turboshaft engine and configured to operate in a motor mode to provide mechanical propulsive power and in a generator mode to receive mechanical power and provide electrical power,
- at least one auxiliary energy source coupled to said propulsive electric distribution network and configured to provide energy to said first and second electric machines (MG1 HP, MG2 HP, MG BP) when said first and/or second electric machines are operating in a motor mode and to supply said propulsive electric distribution network,
- electronic energy conversion means coupled to said first and second electric machines (MG1 HP, MG2 HP, MG BP), to the auxiliary energy source and to said propulsive electric distribution network,
- an electric distribution network coupled to loads of said electrified control system, and
- at least one third electric machine (PMG3 HP) mechanically coupled to said high-pressure shaft and configured to operate in a generator mode to receive mechanical power and provide electrical power, said third electric machine (PMG3 HP) providing electrical power exclusively to said electric distribution network coupled to loads of said electrified control system.

* * * * *